(12) United States Patent
Glenn

(10) Patent No.: US 7,052,145 B2
(45) Date of Patent: May 30, 2006

(54) DISPLAYS USING SOLID STATE LIGHT SOURCES

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 0 days.

(21) Appl. No.: 10/789,364

(22) Filed: Feb. 27, 2004

(65) Prior Publication Data
US 2004/0227907 A1    Nov. 18, 2004

Related U.S. Application Data

(60) Provisional application No. 60/450,957, filed on Feb. 28, 2003.

(51) Int. Cl.
| | | |
|---|---|---|
| G03B 21/26 | (2006.01) | |
| G03B 21/20 | (2006.01) | |
| G03B 21/00 | (2006.01) | |
| H04N 5/64 | (2006.01) | |
| G02F 1/1335 | (2006.01) | |

(52) U.S. Cl. .................. 353/94; 353/102; 353/121; 348/744; 349/5

(58) Field of Classification Search ............... 353/30, 353/31, 94, 102, 121; 348/744; 349/5, 7, 349/8
See application file for complete search history.

(56) References Cited

U.S. PATENT DOCUMENTS

| 4,389,659 A | * | 6/1983 | Sprague ................. 347/136 |
|---|---|---|---|
| 6,154,259 A | | 11/2000 | Hargis et al. ............ 348/756 |
| 6,747,613 B1 | | 6/2004 | Miyawaki et al. .......... 345/9 |
| 6,751,001 B1 | * | 6/2004 | Tanner et al. ............ 359/238 |
| 2003/0076423 A1 | * | 4/2003 | Dolgoff .................. 348/222.1 |

* cited by examiner

Primary Examiner—Melissa Jan Koval
(74) Attorney, Agent, or Firm—Martin Novack

(57) ABSTRACT

Methods and systems are disclosed for displaying images represented by image-representative video signals. In one embodiment, an apparatus is provided for displaying images represented by image-representative input signals, including: rows of micro light sources, such as microlasers or LEDs for producing sheets of light; a diffractive panel, in the path of the sheets of light, which receives the input signals and diffracts the sheets of light to obtain diffracted light imparted with image-representative information; and a Schleiren optical system for processing the diffracted light to produce images represented by the image-representative input signals.

12 Claims, 4 Drawing Sheets

DISPLAYS USING SOLID STATE LIGHT SOURCES

RELATED APPLICATION

The present application claims priority from U.S. Provisional Patent Application 60/450,957, filed Feb. 28, 2003, and said Provisional Patent Application is incorporated herein by reference.

FIELD OF THE INVENTION

This application relates to displays and display methods using solid state light sources, preferably arrays of micro light sources such as microlasers or LEDs.

BACKGROUND OF THE INVENTION

Existing commercial and/or experimental displays of various types, including, for example, light valves, laser scanners, and LCD projectors, provide a reasonable quality of performance and efficiency. However, it is among the objects of the present invention to improve on these existing video displays and display techniques.

SUMMARY OF THE INVENTION

Embodiments of the present invention utilize micro light sources such as microlasers, arrays of which can be manufactured at relatively low cost. An example is microlaser arrays of the type sold by Novalux Company of Sunnyvale, Calif. Several thousand microlasers, which can have selected color emissions, can be produced on a wafer, for example a 4 inch wafer. At recent specifications, the lasers are about 150 microns in diameter with a pitch of about 450 microns between centers. The light output is about 0.1 watt per laser with an efficiency of about 7%. The lasers can be modulated up to about 500 MHz. Specifications are expected to evolve and improve over time.

Attributes of the microlasers which are advantageous in embodiments hereof is that they are already polarized, so there is no polarization loss if they are used with LCD displays. Also, since the devices are not coherent with each other, the problem of laser speckle is reduced or eliminated.

In accordance with an embodiment of the invention, an apparatus is provided for displaying images represented by image-representative input signals, including: rows of micro light sources, such as microlasers or LEDs, for producing sheets of light; a diffractive panel, in the path of said sheets of light, which receives said input signals and diffracts said sheets of light to obtain diffracted light imparted with image-representative information; and a Schleiren optical system for processing said diffracted light to produce images represented by said image-representative input signals.

In accordance with a further embodiment of the invention, an apparatus is provided for receiving frames of input video signals representative of color images, and for projecting the color images, including: a plurality of linear arrays of micro light sources of respective colors; means for coupling lines of the color input signals to respective linear arrays of said micro light sources; and means for vertically scanning light from said linear arrays to form an image. In a preferred form of this embodiment, the micro light sources comprise microlasers, and the means for vertically scanning comprises a scanning mirror. In this embodiment, the plurality of linear arrays of micro light sources comprise a row of red light sources, a row of green light sources, and a row of blue light sources. Also, the means for coupling lines of color input signals to respective linear arrays of said micro light sources includes a plurality of serial to parallel registers, and the means for coupling lines of color input signals to respective linear arrays of said micro light sources is synchronized with the scan of said means for vertically scanning light from said linear arrays. Also, the means for coupling lines of color input signals to respective linear arrays of said micro light sources includes delay means for delaying the signals input to said arrays to combine color component lines at said scanning mirror.

In accordance with another embodiment of the invention, an apparatus is provided for displaying images represented by image-representative input signals, including: a two-dimensional array of microlasers for producing a light beam; a polarizing panel, in the path of said light beam, which receives said input signals and selectively polarizes said light beam in accordance with the input signal to obtain an output light beam; and means for processing said output light beam to produce images represented by said image-representative input signals. In a preferred form of this embodiment, the two-dimensional array of microlasers includes pluralities of microlasers of different colors, and means are provided for sequentially exciting said respective pluralities of microlasers of different colors. Also, the input signals include color component signals, and means are provided for applying said color component signals to said polarizing panel in coordination with the sequential excitation of said pluralities of microlasers of different colors.

Further features and advantages of the invention will become more readily apparent from the following detailed description when taken in conjunction with the accompanying drawings.

DETAILED DESCRIPTION

Figure 1:
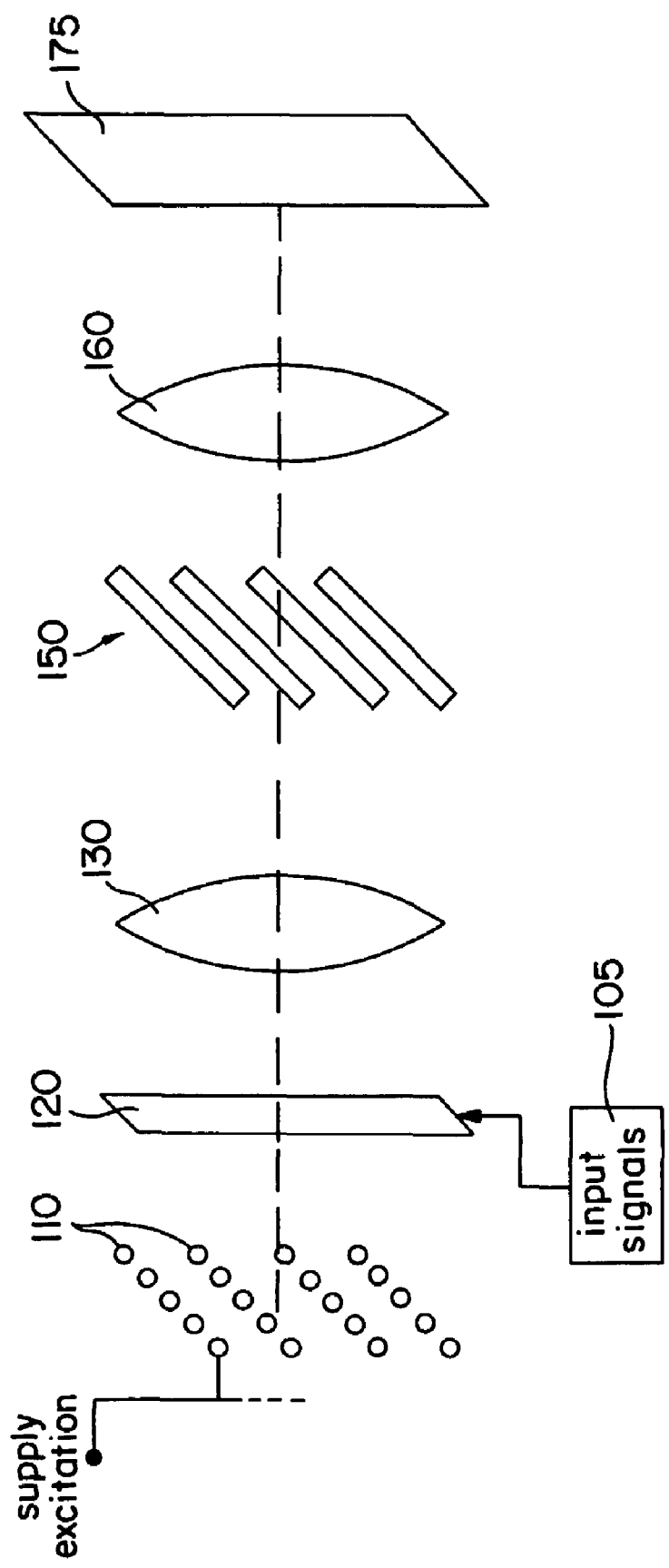
FIG. 1 is a diagram, partially in block form, of a Schleiren type of optical projection system in accordance with an embodiment of the invention, and which can be used in practicing an embodiment of the method of the invention.

FIG. 1 is a diagram of a Schleiren display system for displaying image-representative signals, such as video signals, received from an input source 105 coupled with a diffractive panel, for example a diffractive liquid crystal (LC) panel 120 as described in my U.S. Pat. No. 5,231,432. Linear arrays 110 of micro light sources, such as microlasers provide "sheets" of light, similar to the light that would emanate from the slots of a grating, such as the input bars of a typical Schleiren optical system. [Excitation for light sources, throughout, where not shown, can be implied.]

After passing through the diffractive LC panel, the light, now diffracted with the image-representative video information, successively passes through Schleiren lens 130, output Schleiren bars 150, and projections lens 160, for ultimate display on screen 175. [It will be understood, throughout, that an illustrated single lens may alternatively comprise a lens system.] Reference can be made to my above-referenced U.S. Pat. No. 5,231,432 with regard to the optical processing. It will be understood that the modulator could alternatively be of a reflective type.

Figure 2:
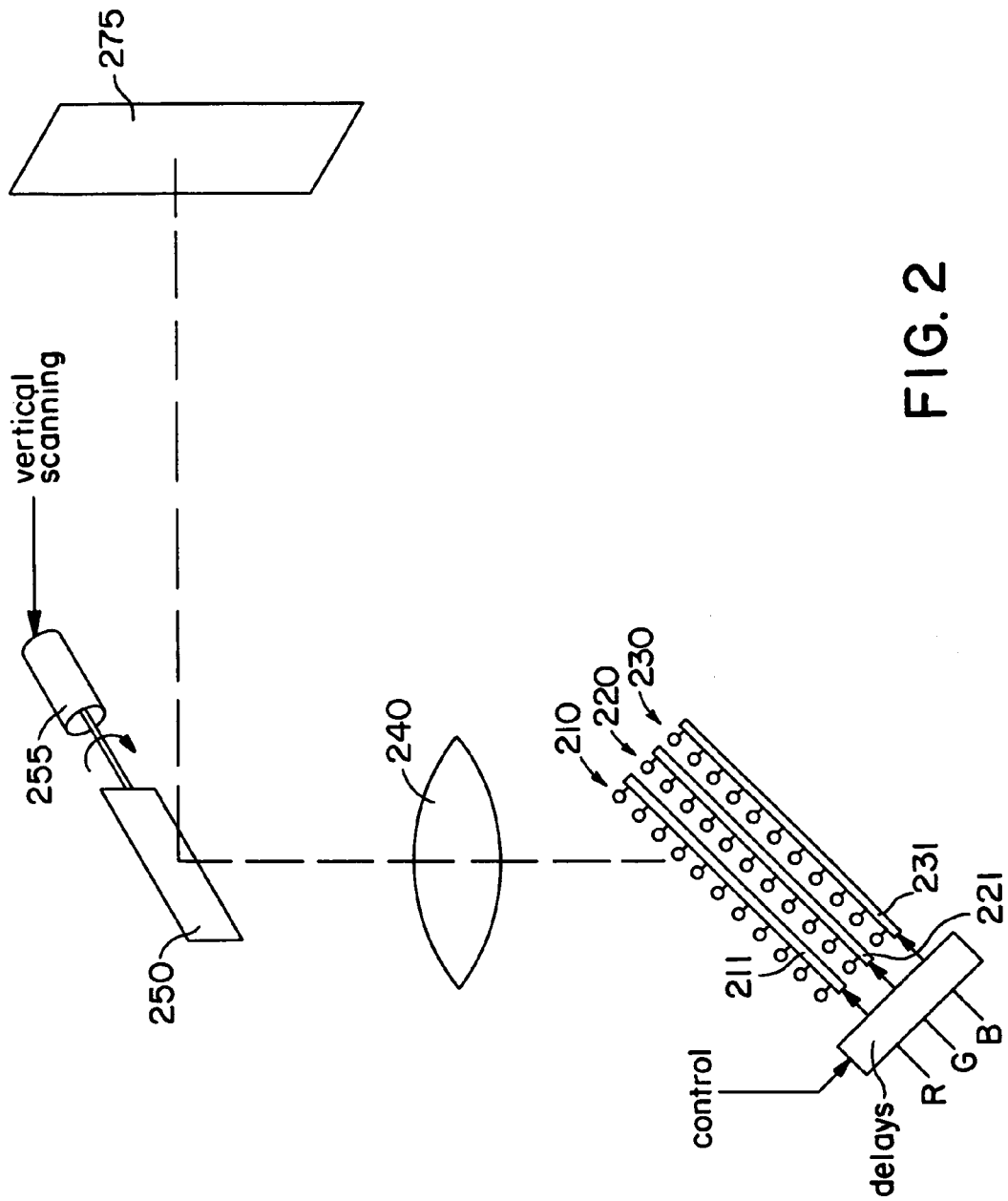
FIG. 2 is a diagram, partially in block form, of a scanning optical projection system in accordance with another embodiment of the invention, and which can be used in practicing a method in accordance with another embodiment of the invention.

The embodiment of FIG. 2 utilizes linear arrays of micro light sources, 110,120, and 130, which emit at three respective primary colors; red, blue, and green. In the present embodiment, the input signal is illustrated as being in RGB format. Each scan line of R, G, and B signals are read into respective registers, 111, 121, and 131, and then coupled in parallel to the respective microlasers. Accordingly, the line arrays of microlasers respectively generate a red line, a green line, and a blue line for one composite line of the image. The scan line is projected on screen 275 by projection lens 240 and scanning mirror 250 which implements the vertical scan for each frame. Other suitable scanners could be employed to achieve the vertical scan of individual scan lines that are produced by the arrays 210, 220 and 230. In the illustrated embodiment, the mirror 250 is controlled by a galvanometer 255, which responds to the vertical scanning signals. In this embodiment, controlled delays are employed, as indicated at 205, to put the projected color component lines at the same position (to obtain the composite colored scan line), by using delays that correspond to the timing of physical offset of the color component lines at the scanning mirror. The coordination could also be performed optically. For HDTV, this system would have more than enough light for practical applications. Each line could have, for example, 1900 microlasers. It could produce a light output of about 570 watts (285,000 lumens). This would be more than ten times the light required for a theater projector.

Figure 3:
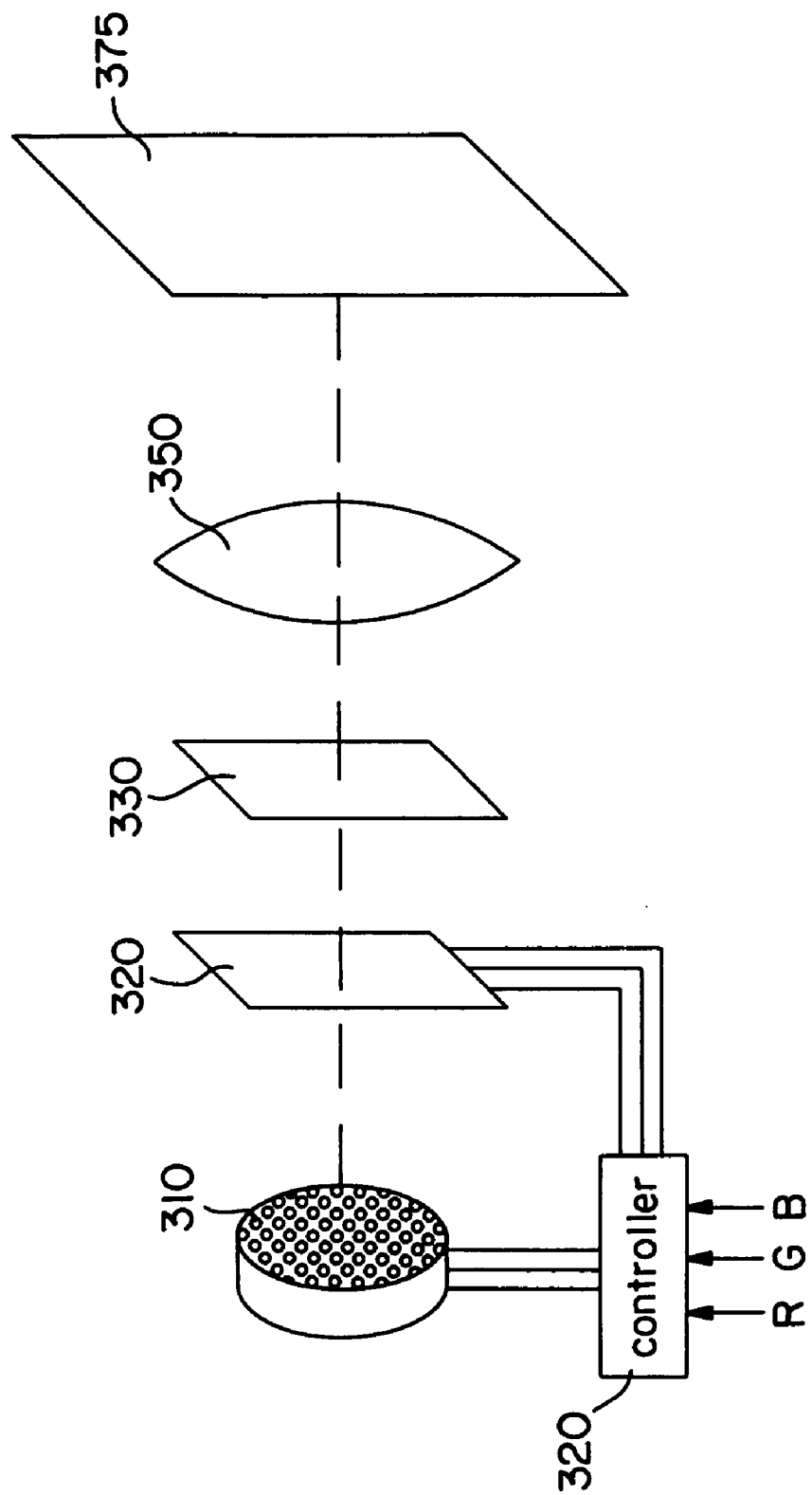
FIG. 3 is a diagram, partially in block form, of an optical projector system based on a polarization principle, in accordance with a further embodiment of the invention, and which can be used in practicing a method of a further embodiment of the invention.

FIG. 3 shows an embodiment of an LCD projector that employs a two dimensional array 310 of microlasers that are used as a light source. This projector operates using a polarization principle, and it is advantageous to have light sources, such as the microlasers, that do not require polarization since they are already polarized. Light from the array 310 is passed through a liquid crystal (LC) panel 320, which receives an input video signal, and operates, as known in the art, to provide polarization in accordance with signal intensity applied at each pixel location on the panel. The light, polarized in accordance with the image information, is passed through analyzer 330, and the resultant video image is projected by projection lens 350 onto screen 375. For color presentation, an array 310 of microlasers of, for example, red, blue, and green emitters arranged in a diagonal pattern, is controlled by controller 312 to emit the respective colors in field sequential manner. The control signal also determines the color component signal applied to the LC panel 320. A simultaneous version, with separate color channels, could also be used.

Figure 4:
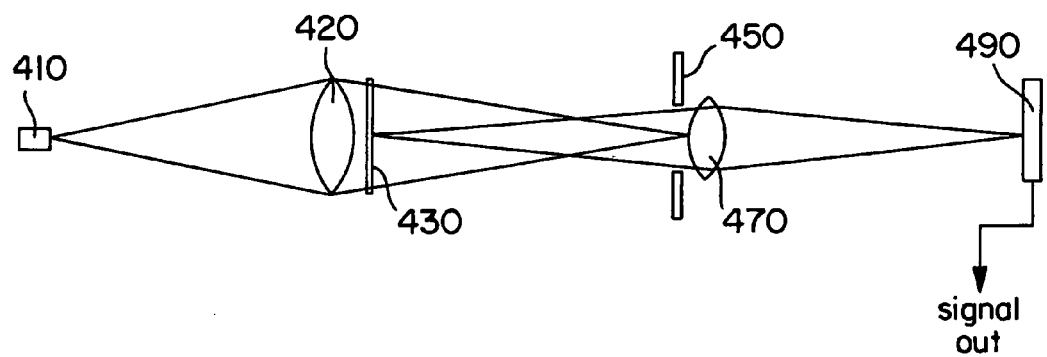
FIG. 4 is a diagram, partially in block form, of a film recording system and technique.
Figure 5:
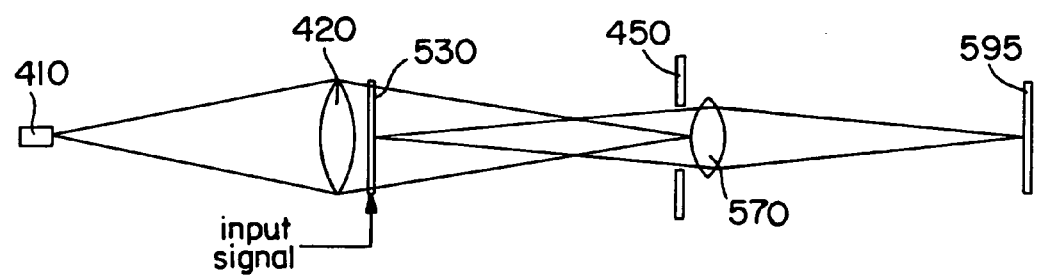
FIG. 5 is a diagram, partially in block form, of a technique for telecine recording of film from electronic signals.

As illustrated in FIG. 4, a micro light source 410, such as a microlaser source, can be used to produce a very sharp cut-off optical pre or post filter. In the FIG. 4 arrangement, the laser light is passed through field lens 420 and film frame 430 and then through an aperture spatial filter mask 450, and imaged by imaging lens 470 onto image sensor 490, for example, a CCD sensor. This eliminates alias beats with the image or film grain for a digitizer. If desired, the image sensor can be positioned where the filter mask is, which will provide a polar plot of the Fourier transform of the film image. For an LCD telecine, the filter removes the visibility of the pixel structure. An optical system for this embodiment is shown in FIG. 5. In this embodiment, an LC panel 530 is provided as shown, and receives, as an input, an image-representative video signal. The filtered image can be recorded on film 595, after passage through spatial filter mask 450 and camera lens 570.

The invention claimed is:

1. Apparatus for displaying images represented by image-representative input signals, comprising:
    rows of micro light sources for producing sheets of light;
    a diffractive panel, in the path of said sheets of light, which receives said input signals and diffracts said sheets of light to obtain diffracted light imparted with image-representative information; and
    a Schleiren optical system for processing said diffracted light to produce images represented by said image-representative input signals.

2. Apparatus as defined by claim 1, wherein said input signals comprise video signals.

3. Apparatus as defined by claim 1, wherein said micro light sources comprise microlasers.

4. Apparatus as defined by claim 1, wherein said Schleiren optical system includes a Schleiren lens, output Schleiren bars, and a projection lens.

5. Apparatus as defined by claim 1, wherein said diffractive panel comprises a transmissive liquid crystal panel.

6. Apparatus defined by claim 1, wherein said sheets of light produced by said rows of micro light sources are in the form of light that emanates from a Schleiren input grating.

7. Apparatus defined by claim 5, wherein said sheets of light produced by said rows of micro light sources are in the form of light that emanates from a Schleiren input grating.

8. A method for displaying images represented by image-representative input signals, comprising the steps of
    providing rows of light sources for producing sheets of light;
    providing a modulator, in the path of said sheets of light, which receives said input signals and diffracts said sheets of light to obtain diffracted light imparted with image-representative information; and
    providing a Schleiren optical system for processing said diffracted light to produce images represented by said image-representative input signals.

9. The method as defined by claim 8, wherein said step of providing rows of light sources comprises providing rows of micro light sources.

10. The method as defined by claim 8, wherein said step of providing rows of light sources comprises providing rows of microlasers.

11. The method as defined by claim 8, wherein said step of providing a modulator comprises providing a diffraction panel.

12. The method defined by claim 8, wherein said step of providing rows of light sources for producing sheets of light is operative to produce sheets of light that are in the form of light which emanates from a Schleiren input grating.

* * * * *